United States Patent [19]
Nishizawa et al.

[11] Patent Number: 5,871,829
[45] Date of Patent: Feb. 16, 1999

[54] PRESSURE-SENSITIVE ADHESIVE LABEL

[75] Inventors: Takatoshi Nishizawa; Yasuo Iwasa; Akihiko Ohno, all of Ibaraki, Japan

[73] Assignee: Oji-Yuka Synthetic Paper Co., Ltd., Tokyo, Japan

[21] Appl. No.: 783,703

[22] Filed: Jan. 15, 1997

[30] Foreign Application Priority Data

Mar. 5, 1996 [JP] Japan .................................. 8-073114

[51] Int. Cl.$^6$ ........................................................ B32B 3/26
[52] U.S. Cl. ........................ 428/40.1; 283/81; 428/41.3; 428/41.7; 428/41.8; 428/42.2; 428/138; 428/213; 428/323; 428/910
[58] Field of Search ................................. 428/40.1, 41.3, 428/41.7, 41.8, 42.2, 138, 213, 323, 910; 283/81

[56] References Cited

U.S. PATENT DOCUMENTS

| | | | |
|---|---|---|---|
| 4,666,185 | 5/1987 | Pilborough | 283/81 |
| 5,233,924 | 8/1993 | Ohba | 101/483 |

OTHER PUBLICATIONS

Japanese Industrial Standard, Testing Method for Stretch of Paper and Paperboard, Revised Jul. 1994.
Japanese Industrial Standard, Testing Method for Linear Thermal Expansion Coefficient of Plastics by Thermomechanical Analysis.

*Primary Examiner*—Nasser Ahmad
*Attorney, Agent, or Firm*—Sughrue, Mion, Zinn, Macpeak & Seas, PLLC

[57] ABSTRACT

The present invention provides a novel pressure-sensitive adhesive label which curls little even under the coldest conditions and which has as a surface material a microporous stretched resin film obtained by stretching a crystalline polyolefin resin film containing an inorganic fine powder, a pressure-sensitive adhesive layer provided on one side of the surface material and a release paper provided on the pressure-sensitive adhesive layer, where the microporous stretched resin film satisfies the following physical properties (1) and (2):

(1) the linear thermal expansion coefficient in a machine direction at −10° C. (JIS K-7197) is from 10 to 70 $\mu$m/m·°C.; and
(2) the linear thermal expansion coefficient in the machine direction at 0° C. is from 10 to 75 $\mu$m/m·°C.

5 Claims, No Drawings

PRESSURE-SENSITIVE ADHESIVE LABEL

FIELD OF THE INVENTION

The present invention relates to a pressure-sensitive adhesive label comprising as a surface material a microporous stretched resin film obtained by stretching a crystalline polyolefin resin film containing an inorganic fine powder, a pressure-sensitive adhesive layer provided on a back side of the surface material and a release paper provided on the pressure-sensitive adhesive layer.

Such a pressure-sensitive adhesive label is useful as an emblem, badge, sticker, seal tape, form sheet, bar code paper, merchandise display label, air baggage tag, etc.

BACKGROUND OF THE INVENTION

A pressure-sensitive adhesive label can be used in many environments, e.g., it can be used as a merchandise display label to be stuck on a motor oil can, a kerosene can, it can be used as a label or emblem with characters printed thereon as gift to be attached to children's confectionery and it can be used as an air baggage tag. Such a label typically comprises a pressure-sensitive adhesive layer provided on a back side of a sheet such as pulp paper, aluminum foil, synthetic paper and a biaxially-stretched polyethylene terephthalate film and a release paper provided on the adhesive layer. Characters or images are printed or typed on a front side of the sheet as necessary.

As the release paper, there is often used a laminated paper comprising a pulp paper coated with a polyolefin resin film on one or both sides thereof, glassine paper, resin-coated paper and a release paper comprising a paper substrate coated with a release agent such as a silicone compound or a fluorine compound on one or both sides (front and back) thereof, or the like.

In applications requiring that the adhesive label has pencil writability or water proofness, a synthetic paper is used as the sheet material which forms the surface material as disclosed in JP-B-50-29738 (The term "JP-B" as used herein means an "examined Japanese patent publication"), JP-B-U-2-45893 (The term "JP-B-U" as used herein means an "examined Japanese utility model publication") and U.S. Pat. Nos. 3,963,851 and 5,318,817.

As such a synthetic paper there is used a microporous stretched polyolefin film obtained by stretching a polyolefin film such as polypropylene, polyethylene and polystyrene containing an inorganic fine powder such as calcined clay, calcium carbonate, talc, mica, titanium oxide and diatomaceous earth.

At present, pressure-sensitive adhesive labels comprising as a surface material the foregoing polyolefin synthetic paper which have been put into practical use are excellent in water proofness, abrasion resistance, printability and typability, but they have been recognized to tend to drastically curl at a temperature of 0° C. or below, e.g., in the winter.

Such a pressure-sensitive adhesive label may not be able to be fed or discharged when it is subjected to printing or typing under a bad condition of 0° C. or less. When one tries to stick such a pressure-sensitive adhesive label to an adherend (such as a container) by means of an automatic labeler under such low temperature conditions, when the release paper is peeled off the label, the synthetic paper curls more than it does in the Spring, Summer and Fall seasons. This causes the label to be stuck to the adherend in a position which deviates from the desired predetermined position. Therefore, the distance between the adherend and the label needs to be rather large, which slows the label sticking rate.

It has further been recognized that when used as a address printing label to be stuck on an envelope, such a pressure-sensitive adhesive label is liable to be misfed into or misdischarged from a printer, misarrangement on the envelope and misregistered printing.

The reason why such a polyolefin synthetic paper is curled more in the coldest season is believed to be that the release paper and the synthetic paper have different thermal expansion coefficients and the pulp paper which constitutes the release paper can shrink more easily when it is dried in the winter than in other seasons. Therefore, in order to minimize curling, procedures such as printing, typing and sticking should be carried out under the same condition as are encountered in Spring, Summer and Fall (10° C. to 40° C.). However, this is obviously impractical for all possible users.

SUMMARY OF THE INVENTION

It is therefore an object of the present invention to provide a pressure-sensitive adhesive label which curls little even in the coldest season.

The means to accomplish the foregoing object of the present invention will become more apparent from the following detailed description and examples.

The present invention provides a pressure-sensitive label comprising, as a surface material (the material which will be written on, etc.), a microporous stretched resin film obtained by stretching a crystalline polyolefin resin film containing an inorganic fine powder, a pressure-sensitive adhesive layer provided on a back side of the surface material and a release paper provided on the pressure-sensitive adhesive layer, characterized in that the microporous stretched resin film satisfies the following physical properties (1) and (2), preferably (1) to (4), more preferably (1) to (6):

(1) the linear thermal expansion coefficient in a machine (longitudinal) direction at −10° C. (JIS K-7197) is from 10 to 70 $\mu$m/m·°C.;

(2) the linear thermal expansion coefficient in the machine direction at 0° C. is from 10 to 75 $\mu$m/m·°C.;

(3) the mean value of linear thermal expansion coefficients between −10° C. and +23° C. (JIS K-7197) in the machine direction is from 10 to 80 $\mu$m/m·°C.;

(4) the absolute value of product of the mean value of linear thermal expansion coefficient in the machine direction and the Young's modulus of the microporous resin film in the machine direction (JIS P-8132; units: kg/cm$^2$) is from 200,000 to 1,000,000;

(5) the Young's modulus in the machine direction (JIS P-8132) is from 5,000 to 20,000 kg/cm$^2$; and (6) the porosity as defined by the following equation (I) is from 35% to 55%:

$$\% \text{ Porosity} = \frac{\rho_0 - \rho}{\rho_0} \times 100 \quad (I)$$

where $\rho_0$ is the density of unstretched resin film; and $\rho$ is the density of stretched resin film.

The present invention also provides a pressure-sensitive label comprising, as a surface material (the material which will be written on, etc.), a microporous stretched resin film obtained by stretching a crystalline polyolefin resin film containing an inorganic fine powder, a pressure-sensitive adhesive layer provided on the back side of the surface material and a release paper provided on the pressure-sensitive adhesive layer, characterized in that the microporous stretched resin film satisfies the following physical properties (1') to (6'):

(1') the linear thermal expansion coefficient in the machine direction at −10° C. (JIS K-7197) is from 10 to 70 μm/m·°C.;

(2') the linear thermal expansion coefficient in the machine direction at 0° C. is from 10 to 75 μm/m·°C.;

(3') the mean value of linear expansion coefficients in the machine direction between −10° C. and +23° C. (JIS K-7197) is from 70 to 85 μm/m·°C.;

(4') the absolute value of product of the mean value of linear expansion coefficient in the machine direction and the Young's modulus in the machine direction of the microporous resin film (JIS P-8132; units: kg/cm$^2$) is from 900,000 to 1,300,000;

(5') the Young's modulus in the machine direction (JIS P-8132) is from 10,000 to 30,000 kg/cm$^2$; and (6') the porosity as defined above is from 20% to 30%.

DETAILED DESCRIPTION OF THE INVENTION

The present invention will be further described hereinafter.

Microporous Resin Film:

The microporous stretched resin film on which printing, typing or writing is performed is obtained by stretching a polyolefin film containing an inorganic fine powder and it exhibits the following physical properties (1) and (2):

(1) the linear expansion coefficient in the machine direction at −10° C. (JIS K-7197) is from 10 to 70 μm/m·°C.; and (2) the linear expansion coefficient in the machine direction at 0° C. is from 10 to 75 μm/m·°C.

Preferably, the Young's modulus in the machine direction at 23° C. is from 5,000 to 20,000 kg/cm$^2$, more preferably from 5,000 to 10,000 kg/cm$^2$, and the porosity is from 35% to 55% as calculated from the following equation (I). The mean value of linear thermal expansion coefficients in the machine direction at a temperature ranging from −10° C. to +23° C. (JIS K-7197) is preferably from 10 to 80 μm/m·°C., and the absolute value of product of the mean value of linear thermal expansion coefficient in the machine direction and the Young's modulus in the machine direction of the microporous resin film (JIS P-8132; units: kg/cm$^2$) is from 200,000 to 1,000,000.

$$\% \text{ Porosity} = \frac{\rho_0 - \rho}{\rho_0} \times 100 \quad (I)$$

where $\rho_0$ is the density of unstretched resin film; and $\rho$ is the density of stretched resin film.

When the microporous stretched polyolefin film of the present invention is obtained by stretching a polyolefin film containing an inorganic fine powder and it has a porosity of from 20% to 30%; it preferably exhibits the following physical properties (1') to (6'):

(1') the linear thermal expansion coefficient in the machine direction at −10° C. (JIS K-7197) is from 10 to 70 μm/m·°C.;

(2') the linear thermal expansion coefficient in the machine direction at 0° C. is from 10 to 75 μm/m·°C.;

(3') the mean value of linear thermal expansion coefficients in the machine direction between −10° C. and +23° C. (JIS K-7197) is from 70 to 85 μm/m·°C.;

(4') the absolute value of product of the mean value of linear thermal expansion coefficient in the machine direction and the Young's modulus in the machine direction of the microporous resin film (JIS P-8132; units: kg/cm$^2$) is from 900,000 to 1,300,000;

(5') the Young's modulus in a machine direction (JIS P-8132) is from 10,000 to 30,000 kg/cm$^2$; and (6') the porosity as defined above is from 20% to 30%.

The same procedures as disclosed in the working examples in some patents as later described in following examples (1) to (3) are repeated, except for increasing a content of inorganic filler, or containing an inorganic filler having a smaller linear thermal expansion coefficient and/or stretching the film at a lower temperature or a higher stretch ratio to provide such a microporous stretched resin film made of a stretched polyolefin resin satisfying the foregoing physical properties, that is, a synthetic paper having a lower linear thermal expansion coefficient in the machine direction and a lower Young's modulus in the machine direction than commercial products or those described in these examples (1) to (3).

For the materials and structure of microporous synthetic papers made of conventional stretched polyolefin resin films, reference can be made to the following examples (1) to (3):

(1) Microporous biaxially stretched polyolefin film containing an inorganic filler in an amount of from 8 to 65% by weight (as disclosed in JP-B-54-31032 and U.S. Pat. Nos. 3,775,521, 4,191,719, 4,877,616 and 4,560,614)

(2) Synthetic paper comprising a biaxially stretched polyolefin film as a base (core) layer and a monoaxially stretched film containing an inorganic fine powder in an amount of from 8% to 65% by weight as a paper-like layer (as disclosed in JP-B-46-40794, JP-A-57-149363 (The term "JP-A" as used herein means an "unexamined published Japanese patent application") and JP-A-57-181829)

The synthetic paper may have a multi-layer structure. For example, the synthetic paper may consist of two layers, three layers or more layers. An example of a three-layer synthetic paper is one comprising a base layer having provided on both sides thereof monoaxially-stretched films as paper-like layers (as disclosed in JP-B-46-40794). Other examples of a multi-layer (three or more layers) synthetic paper include a three- to seven-layer synthetic paper comprising a resin film layer which is interposed between a paper-like layer and a base layer (as disclosed in JP-B-50-29738, JP-A-57-149363, JP-A-56-126155 and JP-A-57-181829).

The preparation of the three-layer synthetic paper can be accomplished by a process which comprises stretching a thermoplastic resin film containing an inorganic fine powder in an amount of from 8% to 50% by weight at a temperature lower than the melting point of the raw resin material (without inorganic fine powder) in one direction, laminating the monoaxially-stretched film thus obtained as a base layer to thermoplastic resin films containing an inorganic fine powder in an amount of from 8% to 65% by weight on both sides of the monoaxially-stretched film as a base layer, and then stretching the laminate in the direction perpendicular to the stretching direction of the film constituting the base layer. The three-layer synthetic layer obtained by this process is a laminate having numerous voids therein which comprises a biaxially-stretched base layer and a monoaxially-stretched paper-like layer provided on both sides thereof.

(3) Synthetic paper comprising the foregoing synthetic paper (2) laminated to another synthetic paper at the paper-like layer side or sides thereof. Specific examples of such a structure include: (a) synthetic paper which comprises the foregoing synthetic paper (2) having a transparent thermoplastic resin laminate layer free of an inorganic fine powder having a thickness of from 0.1 to 20 µm provided on the paper-like side or sides thereof so that high gloss printing can be performed thereon (as disclosed in JP-B-4-60437, JP-B-1-60411 and JP-A-61-3748); (b) synthetic paper comprising, as a support, a multi-layer film having a biaxially-stretched film of thermoplastic resin as a base layer and a monoaxially-stretched film of thermoplastic resin containing from 8 to 65% by weight of an inorganic fine powder laminated on both sides of the base layer, a transparent polyolefin film free of an inorganic fine powder laminated on one side of such a support and a primer coating layer having an antistatic effect provided thereon (as disclosed in JP-A-61-3748); and (c) synthetic paper comprising a biaxially-stretched polyolefin film as a base layer and a paper-like layer made of a monoaxially-stretched polyolefin film containing from 8% to 65% by weight of an inorganic fine powder and a surface layer made of a monoaxially-stretched polyolefin film laminated on at least one side of the base layer, the multi-layer resin film satisfying the following relationship (II):

$$R \geq t \geq (1/10) \times R \tag{II}$$

wherein the thickness of the surface layer is t and the average particle diameter of the inorganic fine powder present in the paper-like layer is R.

As the polyolefin resin to be used as a base layer resin of the microporous resin film there may be used polyethylene, polypropylene, an ethylene-propylene copolymer, poly(4-methylpentene-1), a propylene-4-methylpentene-1 copolymer, a propylene-ethylene-butene-1 copolymer, etc., either singly or in admixture. Polypropylene, if used as a main resin for the base layer, preferably comprises or includes a thermoplastic resin having a lower melting point than the polypropylene, e.g., polyethylene, polystyrene or an ethylene-vinyl acetate copolymer in an amount of from 3% to 25% by weight based on the layer composition. This lower melting point component enhances stretchability.

Examples of the inorganic fine powder employable herein include calcium carbonate, calcined clay, silica, diatomaceous earth, talc, titanium oxide, and barium sulfate. The average particle diameter of such inorganic fine powders is preferably from 0.03 to 8 µm.

The stretch ratio at which the microporous stretched resin film is prepared is preferably from 4 to 12 in both the machine (longitudinal) and crosswise direction. The stretching temperature at which a homopolypropylene (melting point: 164° C. to 167° C.), if used, is stretched is preferably from 140° C. to 155° C. The stretching temperature at which a high density polyethylene (melting point: 121° C. to 134° C.), if used, is stretched is preferably from 105° C. to 125° C.

The thickness of the stretched polyolefin resin film having fine voids or micropores formed therein is from 30 to 300 µm, preferably from 50 to 150 µm.

If the linear thermal expansion coefficient in the machine direction of the microporous stretched resin film exceeds the upper limit defined by the foregoing requirements (1) (at −10° C.) and (2) (at 0° C.), the resulting pressure-sensitive adhesive label shows remarkably high curling in the coldest season.

The properties of the polyolefin resin and the restriction on the stretch ratio and the content of the inorganic filler to be incorporated in the film make it difficult to reduce the linear thermal expansion coefficient of the film to a value less than that defined by the foregoing requirements (1) (at −10° C.) and (2) (at 0° C.), that is, so that the same is closer to the linear thermal expansion coefficient of pulp paper.

In order to inhibit curling, the microporous stretched resin film preferably has a porosity as high as from 35% to 55% and a Young's modulus in the machine direction of from 5,000 to less than 10,000 kg/cm². However, if the stretched microporous resin film has too high a porosity, it may provide a wrinkled pressure-sensitive adhesive label when it is subjected to processing for the preparation of a pressure-sensitive adhesive label using some types of machinery for printing, the application of pressure-sensitive adhesive, adhering of a release paper, etc. For use in such machinery, a microporous stretched film having a porosity of from 20% to 30% and a Young's modulus in a machine direction of from 10,000 to 30,000 kg/cm² is desirable.

Pressure-Sensitive Adhesive:

Examples of the pressure-sensitive adhesive employable herein include a polyisobutylene rubber, a butyl rubber, a rubber adhesive comprising a mixture of polyisobutylene rubber and butyl rubber dissolved in an organic solvent such as benzene, toluene, xylene and hexane, an adhesive obtained by mixing such a rubber adhesive with a tackifier such as abietic acid rosin ester, a terpene-phenol copolymer or a terpene-indene copolymer (all the foregoing are "rubber adhesives"), and an acrylic adhesive obtained by dissolving an acrylic copolymer having a glass transition point of not higher than −20° C., such as a 2-ethylhexyl acrylate-n-butyl acrylate copolymer or a 2-ethylhexyl acrylate-ethyl acrylate-methyl methacrylate copolymer in an organic solvent such as toluene, xylene and so on.

The coated amount of the pressure-sensitive adhesive is preferably from 3 to 40 g/m², more preferably from 10 to 30 g/m², calculated in terms of dried solid content.

The thickness of the pressure-sensitive adhesive which has been applied and dried is normally from 10 to 50 µm, if it is an acrylic adhesive, or from 80 to 150 µm, if it is a rubber adhesive.

When the adhesion between the microporous stretched resin film and the pressure-sensitive adhesive is small (less than 100 g/15 mm wide), an anchor coat is preferably applied to the back of the microporous resin film before the application of the pressure-sensitive adhesive.

As such an anchor coat there may be used a polyurethane, a polyisocyanate-polyether polyol copolymer, a polyisocyanate-polyester polyol-polyethyleneimine copolymer, an alkyl titanate or the like. Such an anchor coat is normally dissolved in an organic solvent such as methanol, water, ethyl acetate, toluene and hexane before application, the solvent thereafter being removed by drying.

The amount of the anchor coat to be applied to the substrate is from 0.01 to 5 g/m², preferably from 0.05 to 2 g/m², calculated in terms of dried solid content.

Release Paper:

The release paper comprises a releasable resin layer formed on the surface of a pulp paper, the pulp paper having a weight of from 80 to 300 g/m². The releasable resin layer can be formed by a process which comprises dissolving a releasable resin such as a silicone resin or a polyethylene wax in the foregoing organic solvent, and then applying the solution to the pulp paper, followed by drying.

The coated amount of the releasable resin is from 0.5 to 10 g/m², preferably from 1 to 8 g/m², calculated in terms of dried solid content.

Printing, Typing:

Information such as a merchandise name, a merchandise make, a time period, a character pattern, blanks to be filled in, a bar code, etc., are printed on the surface of the microporous resin film as necessary.

Printing may be effected before application of the pressure-sensitive adhesive or may be made on the pressure-sensitive adhesive label structure having a release paper adhered thereto.

The microporous resin film may comprise an ink-receiving layer such as an ink jet recording layer or a heat transfer image-receiving layer provided on the surface thereof, depending on the purpose of use, such as a name card or an air baggage tag.

The present invention will be now further described in the following Examples.

PREPARATION OF MICROPOROUS RESIN FILM

PREPARATION EXAMPLE 1

Process (1) A composition ($a^1$) obtained by mixing a mixture of 72% by weight of a polypropylene having a melt flow rate (MFR; JIS K-7211, at 230° C., load 2.16 kg) of 0.8 g/10 min. and 5% by weight of a high density polyethylene with 23% by weight of calcium carbonate having an average particle diameter of 1.5 μm was kneaded and extruded through an extruder which had been adjusted to a temperature of 270° C. to form a film which was then cooled to a temperature of 50° C. by a cooling apparatus to obtain an unstretched film.

The unstretched film thus obtained was heated to a temperature of 140° C., at which temperature it was stretched at a stretch ratio of 5 in the machine (longitudinal) direction to obtain a five-fold stretched film.

Process (2) A surface layer composition ($a^2$) obtained by mixing 55% by weight of a polypropylene having an MFR of 4.0 g/10 min. with 45% by weight of calcium carbonate having an average particle diameter of 1.5 μm was kneaded and extruded through an extruder which had been adjusted to a temperature of 270° C. to form a film which was then laminated on the front surface side of the five-fold stretched film obtained in Process (1).

Separately, a composition ($a^3$) obtained by mixing 55% by weight of a polypropylene having an MFR of 4.0 g/10 min. with 45% by weight of calcium carbonate having an average particle diameter of 1.5 μm and a back surface side layer mixture ($a^4$) obtained by mixing 84% by weight of a polypropylene having an MFR of 4.0 g/10 min. with 16% by weight of calcium carbonate having an average particle diameter of 1.5 μm were melt-kneaded at a temperature of 270° C. in separate extruders, supplied into a co-extrusion die in which they were laminated, and then extruded through the co-extrusion die to form a film which was then laminated to the side opposite the front surface side of the five-fold stretched film obtained in Process (1) with the layer of the back surface side layer mixture outermost. The laminate thus obtained was cooled to a temperature of 60° C., heated to a temperature of 150° C. at which temperature it was then stretched by a tenter at a stretch ratio of 7.5 in the crosswise direction, annealed at a temperature of 162° C., cooled to a temperature of 60° C., at which temperature it was then slit at its edges to obtain a 80-μm thick four-layer laminated stretched film (($a^2$)/($a^1$)/($a^3$)/($a^4$); thickness: 20/40/5/15 μm) having fine voids (porosity: 40%).

PREPARATION EXAMPLE 2

Process (1) A composition ($a^1$) obtained by mixing 77% by weight of a polypropylene having an MFR of 0.8 g/10 min. with 3% by weight of a high density polyethylene and 20% by weight of calcium carbonate having an average particle diameter of 1.5 μm was kneaded and extruded through an extruder which had been adjusted to a temperature of 270° C. to form a film which was then cooled at a temperature of 50° C. by a cooling apparatus to obtain an unstretched film. The unstretched film thus obtained was heated to a temperature of 140° C. at which temperature it was then stretched at a stretch ratio of 5 in the machine direction.

Process (2) A composition ($a^2$) obtained by mixing 60% by weight of a polypropylene having an MFR of 4.0 g/10 min. with 40% by weight of calcium carbonate having an average particle diameter of 1.5 μm was kneaded in another extruder and then extruded through a die to form a film which was then laminated on both sides of the five-fold stretched film obtained in Process (1) to obtain a three-layer laminated film.

Subsequently, the three-layer laminated film was cooled to a temperature of 60° C., and then heated to a temperature of about 155° C. at which temperature it was then stretched by a tenter at a stretch ratio of 7.5 in the crosswise direction, annealed at a temperature of 162° C., and then cooled to a temperature of 60° C. at which temperature it was then slit at its edges to obtain a three-layer (mono-axially stretched film/biaxially stretched film/monoaxially stretched film) laminated stretched film having a thickness of 80 μm ($a^2$/$a^1$/$a^2$=16 μm/48 μm/16 μm) (porosity: 38%).

PREPARATION EXAMPLE 3

The procedure of Preparation Example 2 was followed to obtain a three-layer stretched microporous resin film except that the temperature at which the crosswise direction stretching was performed was changed from 155° C. to 150° C. (porosity: 44%).

PREPARATION EXAMPLE 4

Process (1) A composition ($a^1$) obtained by mixing 67% by weight of a polypropylene having an MFR of 0.8 g/10 min. with 3% by weight of a high density polyethylene and 30% by weight of calcium carbonate having an average particle diameter of 1.5 μm was kneaded and extruded through an extruder which had been adjusted to a temperature of 270° C. to form a film which was then cooled by a cooling apparatus to obtain an unstretched film. The unstretched film thus obtained was heated to a temperature of 140° C. where it was then stretched at a stretch ratio of 5 in the machine direction.

Process (2) A composition ($a^2$) obtained by mixing 50% by weight of a polypropylene having an MFR of 4.0 g/10 min. with 50% by weight of calcium carbonate having an average particle diameter of 1.5 μm was kneaded in another extruder and then extruded through a die to form a film which was then laminated on both sides of the five-fold stretched film obtained in Process (1) to obtain a three-layer laminated film.

Subsequently, the three-layer laminated film was cooled to a temperature of 60° C., and then heated to a temperature of about 155° C. at which temperature it was then stretched by a tenter at a stretch ratio of 7.5 in the crosswise direction, annealed at a temperature of 162° C., and then cooled to a temperature of 60° C. at which temperature it was then slit at its edges to obtain three-layer (monoaxially stretched film/biaxially stretched film/monoaxially stretched film) laminated stretched film having a thickness of 80 μm ($a^2$/$a^1$/$a^2$=16 μm/48 μm/16 μm) (porosity: 46%).

PREPARATION EXAMPLE 5

Process (1) A composition (a$^1$) obtained by mixing 81% by weight of a polypropylene having an MFR of 0.8 g/10 min. with 3% by weight of a high density polyethylene and 16% by weight of calcium carbonate having an average particle diameter of 1.5 μm was kneaded and extruded through an extruder which had been adjusted to a temperature of 270° C. to form a film which was then cooled by a cooling apparatus to obtain an unstretched film. The unstretched film thus obtained was heated to a temperature of 140° C. at which temperature it was then stretched at a stretch ratio of 5 in the machine direction.

Process (2) A composition (a$^2$) obtained by mixing 54% by weight of a polypropylene having an MFR of 4.0 g/10 min. with 46% by weight of calcium carbonate having an average particle diameter of 1.5 μm was kneaded in another extruder and then extruded through a die to form a film which was then laminated on both sides of the five-fold stretched film obtained in Process (1) to obtain a three-layer laminated film.

Subsequently, the three-layer laminated film was cooled to a temperature of 60° C., heated to a temperature of about 160° C. at which temperature it was then stretched by a tenter at a stretch ratio of 7.5 in the crosswise direction, annealed at a temperature of 165° C., and then cooled to a temperature of 60° C. at which temperature it was then slit at its edges to obtain a three-layer (monoaxially stretched film/biaxially stretched film/monoaxially stretched film) base layer having a thickness of 80 μm (a$^2$/a$^1$/a$^2$=16 μm/48 μm/16 μm). The porosity of the three layers a$^2$/a$^1$/a$^2$ were 30%, 33.7% and 30%, respectively.

PREPARATION EXAMPLE 6

A synthetic paper Yupo KPK #80 (trade name; thickness: 80 μm) made of a multi-layer stretched polypropylene film containing inorganic fine powder available from Oji-Yuka Synthetic Paper Co., Ltd. was used (porosity: 10%).

PREPARATION EXAMPLE 7

A synthetic paper Yupo FPG #80 (trade name; thickness: 80 μm) made of a multi-layer stretched polypropylene film containing inorganic fine powder available from Oji-Yuka Synthetic Paper Co., Ltd. was used (porosity: 32%).

PREPARATION EXAMPLE 8

A synthetic paper Yupo SGE #80 (trade name; thickness: 80 μm) made of a multi-layer stretched polypropylene film containing inorganic fine powder available from Oji-Yuka Synthetic Paper Co., Ltd. was used (porosity: 25%).

PREPARATION EXAMPLE 9

Process (1) A composition (a$^1$) obtained by mixing 81% by weight of a polypropylene having an MFR of 0.8 g/10 min. with 3% by weight of a high density polyethylene and 16% by weight of calcium carbonate having an average particle diameter of 1.5 μm was kneaded and extruded through an extruder which had been adjusted to a temperature of 270° C. to form a film which was then cooled by a cooling apparatus to obtain an unstretched film. The unstretched film thus obtained was heated to a temperature of 140° C. at which temperature it was then stretched at a stretch ratio of 5 in the machine direction.

Process (2) A front surface side layer composition (a$^2$) obtained by mixing 54% by weight of a polypropylene having an MFR of 4.0 g/10 min. with 46% by weight of calcium carbonate having an average particle diameter of 1.5 μm and a back surface side layer composition (a$^3$) obtained by mixing 81% by weight of a polypropylene having an MFR of 4.0 g/10 min. with 3% by weight of a high density polyethylene and 16% by weight of calcium carbonate having an average particle diameter of 1.5 μm were kneaded in separate extruders and then melt-extruded through a die to form films one of which was then laminated on one side of the five-fold stretched film obtained in Process (1) and the other of which was laminated on the other side of the five-fold stretched film to obtain a three-layer laminated film.

Subsequently, the three-layer laminated film was cooled to a temperature of 60° C., heated to a temperature of about 160° C. at which temperature it was then stretched by a tenter at a stretch ratio of 7.5 in the crosswise direction, annealed at a temperature of 165° C., and then cooled to a temperature of 60° C. at which temperature it was then slit at its edges to obtain a three-layer (monoaxially stretched film/biaxially stretched film/monoaxially stretched film) base layer having a thickness of 80 μm (a$^2$/a$^1$/a$^3$=16 μm/48 μm/16 μm). The porosity of each of the three layers a$^2$/a$^1$/a$^3$ was 30%, 29.7% and 3.0%, respectively.

PREPARATION EXAMPLE 10

A resin composition comprising 72% by weight of a polypropylene (melting point: 164° C.) having an MFR of 2 g/10 min., 8% by weight of a high density polyethylene, 17% by weight of calcium carbonate having an average particle diameter of 1.5 μm and 3% by weight of titanium oxide was melt-kneaded and extruded through an extruder set at a temperature of 200° C. to form a film. The film thus formed was cooled by a cooling apparatus, and then heated to a temperature of 150° C. at which temperature it was then stretched at a stretch ratio of 5 in the machine direction to obtain a stretched film.

Subsequently, the stretched film thus obtained was heated to a temperature of 155° C. at which temperature it was then stretched at a stretch ratio of 7 in the crosswise direction, annealed at a temperature of 164° C., and then cooled to a temperature of 60° C. at which temperature it was then slit at its edges to obtain a biaxially-stretched single-layer film having a thickness of 60 μm. The porosity of the biaxially-stretched single-layer film was 46%.

PREPARATION EXAMPLE 11

Process (1) A composition (a$^1$) obtained by mixing a mixture of 72% by weight of a polypropylene having an MFR of 0.8 g/10 min. and 5% by weight of a high density polyethylene with 23% by weight of calcium carbonate having an average particle diameter of 1.5 μm was kneaded and extruded through an extruder which had been adjusted to a temperature of 270° C. to form a film which was then cooled by a cooling apparatus to obtain an unstretched film.

The unstretched film thus obtained was heated to a temperature of 145° C. at which temperature it was then stretched at a stretch ratio of 5 in the machine direction.

Process (2) A front surface side layer composition (a$^2$) obtained by mixing 55% by weight of a polypropylene having an MFR of 4.0 g/10 min. with 45% by weight of calcium carbonate having an average particle diameter of 1.5 μm was kneaded and extruded through an extruder which had been adjusted to a temperature of 270° C. to form a film which was then laminated on one side of the five-fold stretched film obtained in Process (1).

Separately, a back surface side layer mixture (a$^3$) obtained by mixing 84% by weight of a polypropylene having an MFR of 4.0 g/10 min. with 16% by weight of calcium carbonate having an average particle diameter of 1.5 μm was melt-kneaded in an extruder at a temperature of 270° C. and then extruded through an extrusion die to form a film which was then laminated on the side of the five-fold stretched film obtained in Process (1) opposite the side with the front surface side layer composition.

Subsequently, the three-layer laminated film was cooled to a temperature of 60° C., heated to a temperature of 160° C. at which temperature it was then stretched by a tenter at a stretch ratio of 7.5 in the crosswise direction, annealed at a temperature of 165° C., and then cooled to a temperature of 60° C. at which temperature it was then slit at its edges to obtain a 80-μm thick three-layer ($a^2/a^1/a^3$; 15 μm/50 μm/15 μm) synthetic paper having fine voids (porosity: 26%).

PREPARATION EXAMPLE 12

Process (1) A composition ($a^1$) obtained by mixing a mixture of 72% by weight of a polypropylene having an MFR of 0.8 g/10 min. and 5% by weight of a high density polyethylene with 23% by weight of calcium carbonate having an average particle diameter of 1.5 μm was kneaded and extruded through an extruder which had been adjusted to a temperature of 270° C. to form a film which was then cooled by a cooling apparatus to obtain an unstretched film.

Subsequently, the unstretched film thus obtained was heated to a temperature of 142° C. at which temperature it was then stretched at a stretch ratio of 5 in the machine direction.

Process (2) A front surface side layer composition ($a^2$) obtained by mixing 55% by weight of a polypropylene having an MFR of 4.0 g/10 min. with 45% by weight of calcium carbonate having an average particle diameter of 1.5 μm was kneaded and extruded through an extruder which had been adjusted to a temperature of 270° C. to form a film which was then laminated on one side of the five-fold stretched film obtained in Process (1).

Separately, a back surface side layer mixture ($a^3$) obtained by mixing 84% by weight of a polypropylene having an MFR of 4.0 g/10 min. with 16% by weight of calcium carbonate having an average particle diameter of 1.5 μm was melt-kneaded in an extruder at a temperature of 270° C. and then extruded through an extrusion die to form a film which was then laminated on the side of the five-fold stretched film obtained in Process (1) opposite the side with the front surface side layer composition.

Subsequently, the three-layer laminated film was cooled to a temperature of 60° C., heated to a temperature of 160° C. at which temperature it was then stretched by a tenter at a stretch ratio of 7.5 in the crosswise direction, annealed at a temperature of 165° C., and then cooled to a temperature of 60° C. at which temperature it was then slit at its edges to obtain a 80-μm thick three-layer ($a^2/a^1/a^3$; 15 μm/50 μm/15 μm) synthetic paper having fine voids (porosity: 28%).

The microporous stretched resin films obtained in Preparation Examples 1 to 12 were then measured for linear thermal expansion coefficient, mean value of linear thermal expansion coefficients and Young's modulus (23° C., 50% RH) in the following manner:

Linear Thermal Expansion Coefficient:

Using a Type 943 Thermomechanical Analyzer (trade name) available from Du Pont Instrument Co., Ltd.; linear thermal expansion coefficient was measured at −10° C., 0° C. and +23° C.

Mean Value of Linear Thermal Expansion Coefficient:

In accordance with JIS K-7197; the mean value of linear thermal expansion coefficient was determined from the linear thermal expansion coefficients at −10° C. and +23° C.

Young's Modulus:

The measurement was conducted in accordance with JIS P-8132.

The measurement results are set forth in Table 1.

EXAMPLES 1 TO 7; COMPARATIVE EXAMPLES 1 TO 5

A pressure-sensitive adhesive "ORIBINE BPS-1109" (trade name) available from Toyo Ink Mfg. Co., Ltd. was applied to each of the microporous resin films obtained in Preparation Examples 1 to 5 and 8 to 12 on the back surface side thereof in an amount of 25 g/m² (adhesion strength: approx. 60 kg/25 mm width) to form a pressure-sensitive adhesive layer thereon.

A release paper "NONCURL" (trade name; thickness: 150 μm) available from Oji Kako Co., Ltd. was then laminated on the pressure-sensitive adhesive layer to obtain a laminated pressure-sensitive adhesive label consisting of a microporous resin film, a pressure-sensitive adhesive layer and a release paper layer.

These pressure-sensitive adhesive labels were each slit into 100 mm×100 mm square specimens. Five pieces of these specimens were placed on a flat table in a −10° C. constant temperature chamber, a 0° C. constant temperature chamber and a +23° C. and 50% RH constant temperature chamber. These specimens were then stored under these conditions for 24 hours. These specimens were then measured for curling direction [longitudinal (machine) direction or crosswise] and height of curl of the pressure-sensitive adhesive label from flat table (curl height).

TABLE 1

| | | Microporous resin film | | | |
|---|---|---|---|---|---|
| | | Example 1 | Example 2 | Example 3 | Example 4 |
| Microporous resin film | | | | | |
| Preparation Example | | 1 | 2 | 3 | 4 |
| Linear thermal expansion coefficient μm/m · °C. | | | | | |
| −10° C. | Longitudinal | 54.2 | 57.3 | 53.8 | 55.5 |
| | Crosswise | 10.0 | 9.2 | 9.5 | 8.9 |
| 0° C. | Longitudinal | 63.4 | 66.7 | 62.9 | 64.8 |
| | Crosswise | 14.0 | 11.0 | 12.2 | 10.4 |
| Mean value of linear thermal expansion coefficient between −10° C. and +23° C. | | | | | |
| | Longitudinal | 70 | 72 | 70 | 71 |
| | Crosswise | 17 | 19 | 16 | 15 |
| Young's modulus (kg/cm²) | Longitudinal | 9,500 | 9,800 | 8,700 | 7,500 |

TABLE 1-continued

Microporous resin film

| | | | | | |
|---|---|---|---|---|---|
| Product* | Crosswise | 19,500 | 18,000 | 19,000 | 17,000 |
| | Longitudinal | 665,000 | 705,600 | 609,000 | 532,500 |
| | Crosswise | 331,500 | 342,000 | 304,000 | 255,000 |
| % Porosity | | 40 | 38 | 44 | 46 |
| Adhesive label | | | | | |
| Curling direction | | Longi. | Longi. | Longi. | Longi. |
| Curl height (mm) | −10° C. | 9.5 | 9.8 | 9.0 | 8.0 |
| | 0° C. | 5.2 | 5.5 | 4.5 | 3.8 |
| | +23° C. | −0.5 | −0.4 | −0.1 | 0 |
| Occurrence of wrinkles | | — | — | — | — |

| | | Example 5 | Example 6 | Example 7 | Comparative Example 1 |
|---|---|---|---|---|---|
| Microporous resin film | | | | | |
| Preparation Example | | 10 | 11 | 12 | 8 |
| Linear thermal expansion coefficient μm/m · °C. | | | | | |
| −10° C. | Longitudinal | 54.0 | 60.0 | 58.2 | 65.2 |
| | Crosswise | 8.7 | 11.0 | 9.9 | 13.7 |
| 0° C. | Longitudinal | 65.8 | 66.1 | 65.6 | 74.2 |
| | Crosswise | 12.8 | 14.0 | 12.1 | 15.2 |
| Mean value of linear thermal expansion coefficient between −10° C. and +23° C. | | | | | |
| | Longitudinal | 72 | 75 | 73 | 81 |
| | Crosswise | 17 | 17 | 16 | 18 |
| Young's modulus (kg/cm²) | Longitudinal | 8,000 | 13,000 | 12,800 | 14,000 |
| | Crosswise | 19,500 | 28,500 | 28,100 | 29,000 |
| Product | Longitudinal | 576,000 | 975,000 | 934,400 | 1,134,000 |
| | Crosswise | 331,500 | 484,500 | 449,600 | 522,000 |
| % Porosity | | 46 | 26 | 28 | 25 |
| Adhesive label | | | | | |
| Curling direction | | Longi. | Longi. | Longi. | Longi. |
| Curl height (mm) | −10° C. | 8.5 | 10.5 | 10.0 | 14.2 |
| | 0° C. | 4.2 | 6.3 | 5.8 | 8.8 |
| | +23° C. | 0 | −0.2 | −0.3 | 0.3 |
| Occurrence of wrinkles | | — | None | None | — |

| | | Comparative Example 2 | Comparative Example 3 | Comparative Example 4 | Comparative Example 5 |
|---|---|---|---|---|---|
| Microporous resin film | | | | | |
| Preparation Example | | 9 | 5 | 6 | 7 |
| Linear thermal expansion coefficient μm/m · °C. | | | | | |
| −10° C. | Longi. | 69.9 | 66.7 | 70.4 | 64.0 |
| | Crosswise | 14.0 | 14.0 | 15.1 | 12.0 |
| 0° C. | Longi. | 78.2 | 74.0 | 76.1 | 70.9 |
| | Crosswise | 15.7 | 17.1 | 18.2 | 16.7 |
| Mean value of linear thermal expansion coefficient between −10° C. and +23° C. | | | | | |
| | Longi. | 81 | 81 | 83 | 80 |
| | Crosswise | 18 | 19 | 21 | 19 |
| Young's modulus (kg/cm²) | Longi. | 14,000 | 14,500 | 21,300 | 15,000 |
| | Crosswise | 29,500 | 25,500 | 32,400 | 25,000 |
| Product | Longi. | 1,134,000 | 1,174,500 | 1,767,900 | 1,200,000 |
| | Crosswise | 531,000 | 484,500 | 680,400 | 475,000 |
| % Porosity | | 24 | 32 | 10 | 32 |
| Adhesive label | | | | | |
| Curling direction | | Longi. | Longi. | Longi. | Longi. |
| Curl height (mm) | −10° C. | 14.0 | 13.4 | 16.3 | 14.0 |
| | 0° C. | 8.2 | 8.0 | 9.5 | 8.4 |
| | +23° C. | 0.2 | 0.5 | 0.7 | 0.5 |
| Occurrence of wrinkles | | — | Yes | None | Yes |

Longitudinal and Crosswise refer to a machine direction and a transverse direction of a microporous resin film, respectively, which directions are decided based on an extrusion direction of a film from a die.
*[Mean value of linear expansion coefficient × Young's modulus]

The pressure-sensitive adhesive label according to the present invention curled very little even under the coldest conditions.

While the invention has been described in detail and with reference to specific embodiments thereof, it will be apparent to one skilled in the art that various changes and modifications can be made therein without departing from the spirit and scope thereof.

What is claimed is:

1. A pressure-sensitive label comprising a surface material which is a microporous stretched resin film obtained by stretching a crystalline polyolefin resin film containing an inorganic fine powder, a pressure-sensitive adhesive layer provided on the back side of said surface material and a release paper provided on said pressure-sensitive adhesive layer, wherein said microporous stretched resin film satisfies the following physical properties (1), (2), (3) and (4):

(1) the linear thermal expansion coefficient in a machine direction at $-10°$ C. (JIS K-7197) is from 10 to 70 $\mu m/m \cdot °C$.;

(2) the linear thermal expansion coefficient in the machine direction at $0°$ C. is from 10 to 75 $\mu m/m \cdot °C$.;

(3) the mean value of linear thermal expansion coefficients in the machine direction between $-10°$ C. and $+23°$ C. (JIS K-7197) is from 10 to 80 $\mu m/m \cdot °C$.; and (4) the absolute value of the product of said mean value of linear thermal expansion coefficient in the machine direction and Young's modulus in the machine direction of said microporous resin film (JIS P-8132; units: $kg/cm^2$) is from 200,000 to 1,000,000.

2. The pressure-sensitive adhesive label as claimed in claim 1, wherein said microporous stretched resin film further satisfies the following physical properties (5) and (6):

(5) the Young's modulus in the machine direction (JIS P-8132) is from 5,000 to 20,000 $kg/cm^2$; and (6) the porosity as defined by the following equation (I) is from 35% to 55%:

$$\% \text{ Porosity} = \frac{\rho_0 - \rho}{\rho_0} \times 100 \quad (I)$$

where $\rho_0$ is the density of unstretched resin film; and $\rho$ is the density of stretched resin film.

3. A pressure-sensitive adhesive label comprising a surface material which is a microporous stretched resin film obtained by stretching a crystalline polyolefin resin film containing an inorganic powder, a pressure-sensitive adhesive layer provided on the back side of said surface material and a release paper provided on said pressure-sensitive adhesive layer, wherein said microporous stretched film satisfies the following physical properties (1) and (2):

(1) the linear thermal expansion coefficient in a machine direction at $-10°$ C. (JIS K-7197) is from 10 to 70 $\mu m/m \cdot °C$.; and (2) the linear thermal expansion coefficient in the machine direction at $0°$ C. is from 10 to 75 $\mu m/m \cdot °C$.;

wherein said microporous stretched resin film further satisfies the following physical properties (3') to (6'):

(3') the mean value of linear thermal expansion coefficients in the machine direction between $-10°$ C. and $+23°$ C. (JIS K-7197) is from 70 to 85 $\mu m/m \cdot °C$.;

(4') the absolute value of product of said mean value of linear thermal expansion coefficient in the machine direction and the Young's modulus in the machine direction of said microporous resin film (JIS P-8132; units: $kg/cm^2$) is from 900,000 to 1,300,000;

(5') the Young's modulus in the machine direction (JIS P-8132) is from 10,000 to 30,000 $kg/cm^2$; and (6') the porosity as defined by the following equation (I) is from 20% to 30%;

$$\% \text{ Porosity} = \frac{\rho_0 - \rho}{\rho_0} \times 100 \quad (I)$$

where $\rho_0$ is the density of unstretched resin film; and $\rho$ is the density of stretched resin film.

4. The pressure-sensitive label as claimed in claim 1, wherein said crystalline polyolefin resin is a polypropylene.

5. The pressure-sensitive label as claimed in claim 1, wherein the thickness of said microporous stretched resin film is from 30 to 300 $\mu m$.

* * * * *